United States Patent [19]
Staley, Jr.

[11] 3,951,012
[45] Apr. 20, 1976

[54] PROCESS FOR MAKING A FILE AND ARTICLE RESULTING THEREFROM

[75] Inventor: Edward W. Staley, Jr., Cambridge, Ohio

[73] Assignee: Wallace-Murray Corporation

[22] Filed: Jan. 16, 1975

[21] Appl. No.: 541,627

[52] U.S. Cl. .................................. 76/24 R; 29/78; 51/10
[51] Int. Cl.$^2$ .................... B23D 73/12; B24C 1/02; B23D 71/00
[58] Field of Search ............................ 51/319, 10; 76/15–18, 24 R, 24 C; 29/78, 90 A

[56] References Cited
UNITED STATES PATENTS

| | | | |
|---|---|---|---|
| 1,892,984 | 1/1933 | Horii | 76/24 R |
| 2,089,619 | 8/1937 | Ripley | 76/24 R |
| 2,214,954 | 9/1940 | Crater | 76/24 R X |
| 2,897,692 | 8/1959 | Beckner et al. | 76/24 R |
| 2,957,688 | 10/1960 | Luecke | 76/24 R X |
| 3,138,845 | 6/1964 | Hellmann et al. | 29/90 |
| 3,199,171 | 8/1965 | Hellmann et al. | 29/90 |
| 3,225,495 | 12/1965 | de Uries | 51/319 |

*Primary Examiner*—Al Lawrence Smith
*Assistant Examiner*—Nicholas P. Godici
*Attorney, Agent, or Firm*—Schuyler, Birch, Swindler, McKie & Beckett

[57] ABSTRACT

A process for making a file wherein the formation of the file teeth by striking a blank with a chisel-like bit also forms sharp serrations on the back sides of the teeth adjacent the cutting edge, with the improvement of preserving such serrations without substantial removal thereof during the cleaning and finishing steps of such file making process. Such process may include cleaning a formed and hardened file by directing a pressurized stream of frangible glass beads at the file to remove undesired materials associated with the hardening step. The file resulting from such process retains the serrations on the back sides of the teeth whereby wearing away of the original cutting edges of teeth during use serves to expose for cutting purposes some of the sharp serrations.

10 Claims, 10 Drawing Figures

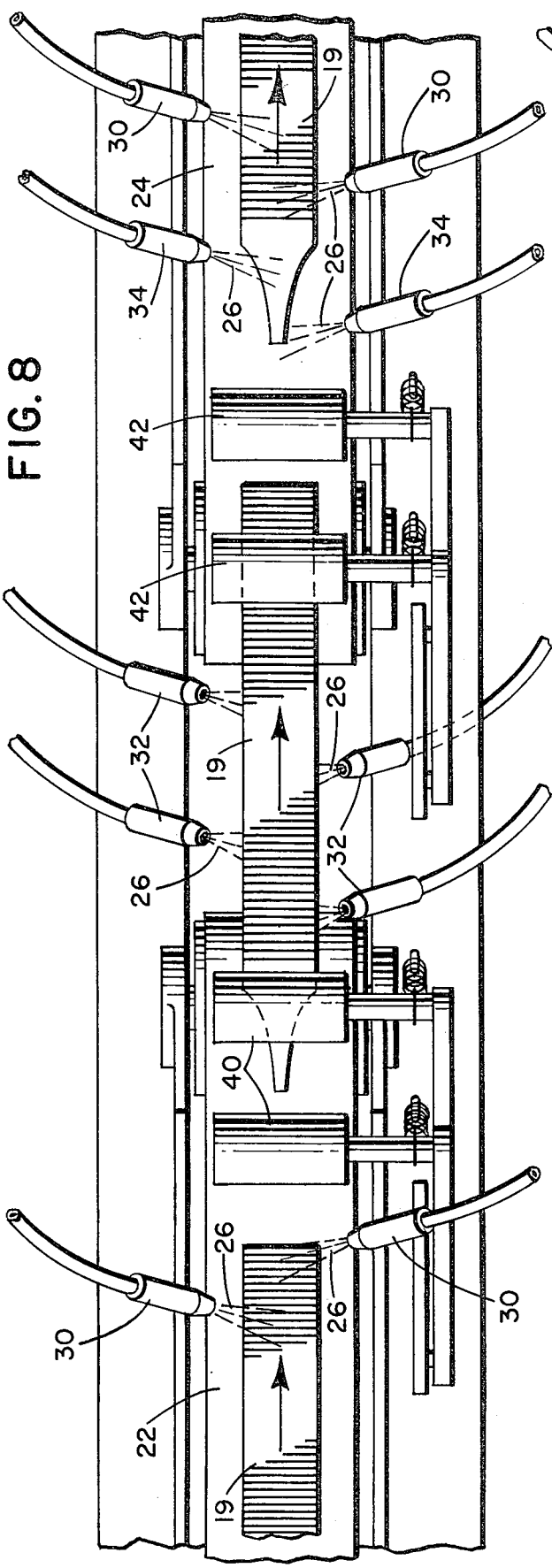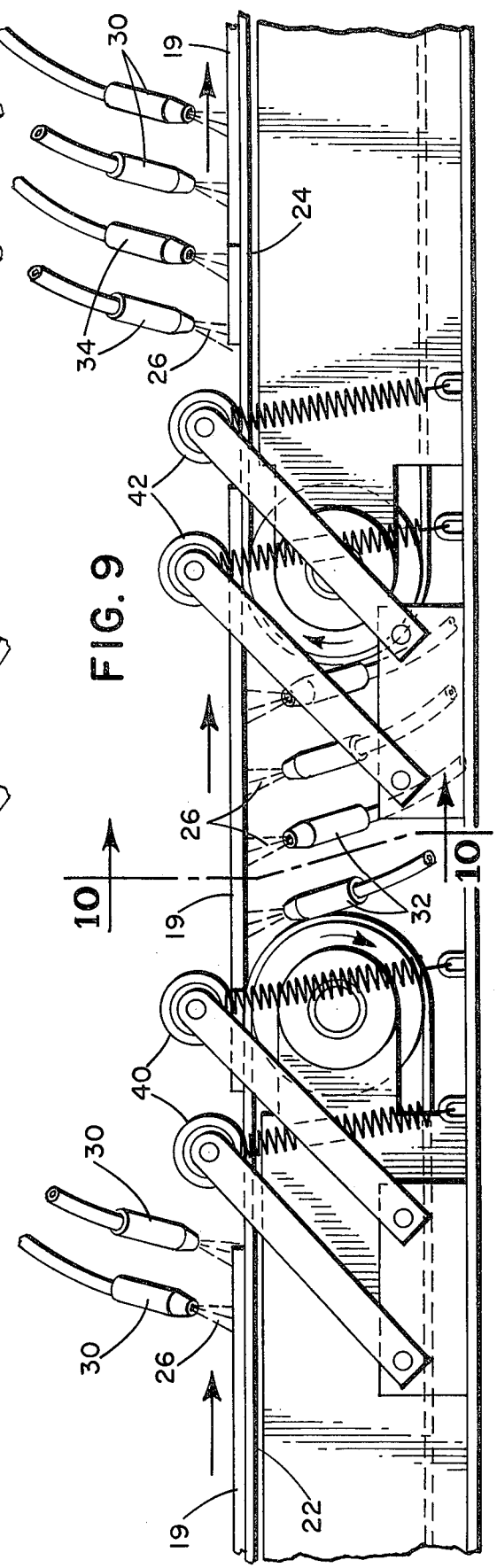

PROCESS FOR MAKING A FILE AND ARTICLE RESULTING THEREFROM

BACKGROUND OF THE INVENTION

Conventional processes for making files, including the steps of forming the file teeth, hardening the file and cleaning the file after hardening are well known in the art. Such conventional processes are exemplified by Beckner et al, U.S. Pat. No. 2,897,692. In such processes the file teeth are formed by striking a file blank with a chisel-like tool at spaced intervals along the length of the blank.

Subsequent to the tooth forming step, the file conventionally is hardened by immersion in either a molten salt bath or a molten lead bath. If the lead bath is used, the file is first coated with a masking material to prevent accumulation of lead in the gullets of the teeth upon cooling. Subsequent to the hardening process it is necessary to clean or "sharpen" the file either to remove the scale and discoloration associated with salt bath hardening or to remove the masking material used in conjunction with the lead bath. Conventionally, this cleaning process has involved the use of an abrasive blasting process incorporating silica or aluminum oxide as the abrading material. Such abrasion has been considered necessary both to remove the undesired materials associated with the hardening process and also to smooth the surfaces of the file teeth to remove any roughness on the teeth caused by the tooth forming process.

In conventional file making processes it has also been considered necessary in the cleaning and finishing steps to erode a portion of the back sides of the file teeth to produce a proper cutting edge, as described in Aitken U.S. Re. No. 20,914. Accordingly, in such conventional processes it has been considered necessary to perform such steps with relatively hard abrasive material, such as silica. Blasting processes involving relatively non-abrasive materials, such as glass beads, have thus been considered unsatisfactory and undesirable.

SUMMARY OF THE INVENTION

It has been discovered recently that preservation of sharp serrations formed on the back sides of the file teeth during the tooth forming process can provide a file with substantially increased performance. More particularly, when such serrations, adjacent the cutting edge of the file tooth, are preserved without substantial erosion during the hardening, cleaning and sharpening processes, such files have shown materially increased cutting ability and useful lifetimes. Accordingly, in this invention a process is disclosed wherein such serrations may be so preserved, thus to provide a file with such improved performance. This process comprises cleaning the files, subsequent to tooth forming and hardening, by directing a pressurized stream of glass beads against the file under a predetermined pressure and at a predetermined angle. The file resulting from such process retains the sharp serrations on the back side of the teeth whereby wearing away of the original cutting edges of the teeth during use serves to expose for cutting purposes some of the retained serrations.

BRIEF DESCRIPTION OF THE ILLUSTRATIONS

The invention will be better understood from a consideration of an illustrative embodiment in which:

FIG. 8 is a plan view of a portion of the file cleaning station of FIG. 7;

FIG. 9 is an elevation of the structure of FIG. 8;

DESCRIPTION OF AN ILLUSTRATIVE EMBODIMENT

This invention is concerned with improvements in the construction and manufacture of files, or metal tools, usually steel, employed for abrading, reducing, or smoothing metal, wood or the like. Files will be understood to be of rectangular, triangular, round or irregular section, of either tapering or uniform width and thickness, and provided with either single or double cut, transverse or oblique teeth, all being immaterial to the invention. A flat, single cut, blunt mill file has been selected for illustrative purposes.

Figure 1:
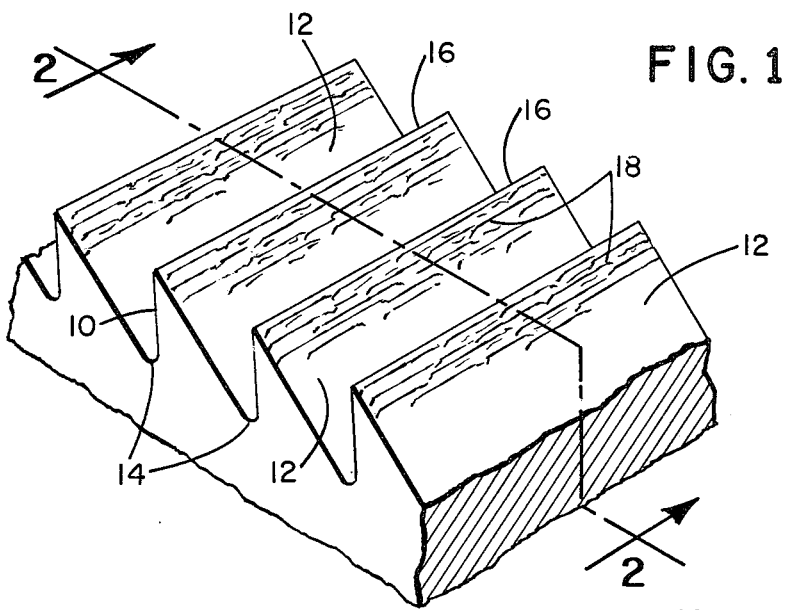
FIG. 1 is a perspective view of a portion of a file immediately subsequent to a tooth forming process.
Figure 2:
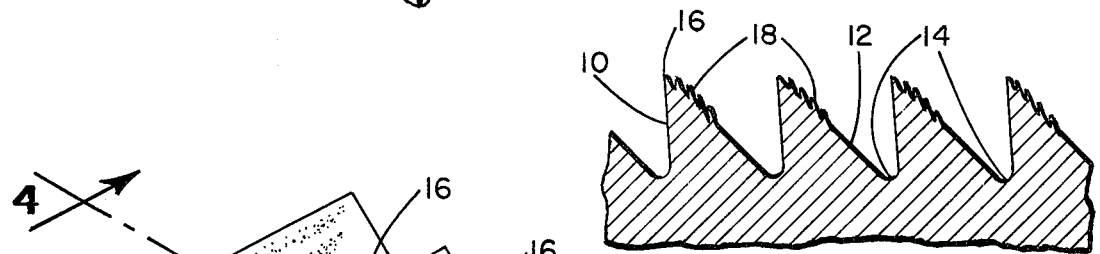
FIG. 2 is a section of the file portion of FIG. 1 taken along lines 2—2.

In the manufacture of files a method of forming the teeth thereof which is conventional and well known in the art comprises striking a blank with repeated, spaced blows of a chisel. Such a procedure suitably may yield file teeth as illustrated in FIGS. 1 and 2, having a relatively steep front side 10 and an inclined back side 12. The gullets 14, at the conjunction of the bases of adjacent teeth may be either sharply angled or, more desirably, rounded as shown. The cutting edge 16 of each tooth generally comprises a sharp point at the conjunction of the front side 10 and the back side 12. Conventional tooth forming techniques, as by such chisel blows, customarily form a plurality of sharp serrations 18 extending longitudinally of the teeth and generally transversely of the file, which serrations are found in the upper portions of the back sides of the teeth, generally parallel to the cutting edge 16, as illustrated in FIGS. 1 and 2. (In these figures the serrations 18 are exaggerated for purposes of illustration.) Heretofore, such serrations 18 have been considered to serve no useful function and have been removed from the finished file by erosion during subsequent hardening, cleaning and finishing steps.

Figure 3:
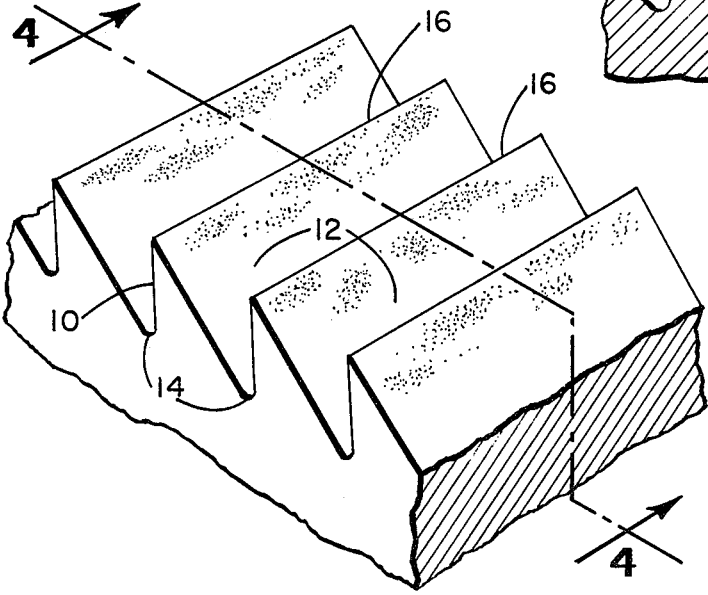
FIG. 3 is a perspective of a portion of a file subsequent to a conventional cleaning and sharpening process.
Figure 4:
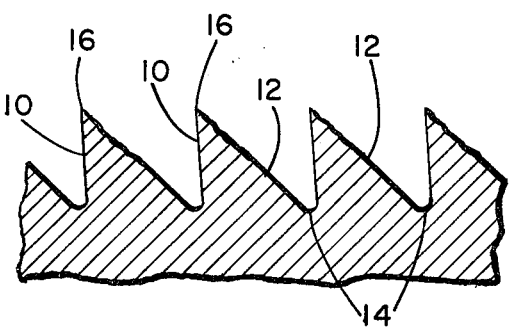
FIG. 4 is a section of the file portion of FIG. 3, taken along lines 4—4.

Subsequent to the tooth forming procedure the file must be hardened. This conventionally is carried out by immersing the file in a bath of molten salt or molten lead. Where the molten lead bath is used, the file is first coated with a masking compound to prevent accumulation of the lead in the gullets 14 between adjacent teeth. After such immersion the files are cooled. Subsequent to the hardening procedure, it is necessary to clean the file to remove any scale and discoloration and, if the lead bath has been used, to remove the masking material from the file. Conventionally, such cleaning process, also referred to as "sharpening", has involved blasting the hardened file with silica grit or similar hard abrasive material. While such blasting, generally directed at the back sides 12, of the file teeth effectively remove any such scale, discoloration or masking material, it has necessarily and intentionally resulted also in the erosion of the serrations 18 formed on the back sides of the file teeth adjacent the cutting edges, as shown by the illustration of a conventionally finished file in FIGS. 3 and 4. In conventional file making procedures this erosion, which results in the substantial elimination of such serrations 18, has been considered a necessary and suitable concomitant to the cleaning process.

It has been discovered recently, however, that preservation of these sharp, chisel-formed serrations 18 on the back sides 12 of the file teeth provides for markedly superior performance both in cutting ability and in useful life of the file. The improved cutting performance results largely from the cutting ability of the retained sharp serrations after the initial cutting edge has been dulled by use. The increased useful life of this improved file, is another, related, result of this serrated structure. Unlike a conventionally processed file in which fracturing of the cutting edge 16 of the file tooth during use serves to expose a dull, unsharpened edge, fracturing of the initial cutting edge 16 of the improved file of FIGS. 1 and 2 exposes one or more of the plurality of sharp serrations 18 for cutting during the forward cutting stroke of the file. Thus the sharp cutting edge of this improved file becomes self-regenerating through the very mechanism of file tooth wear.

Figure 5:
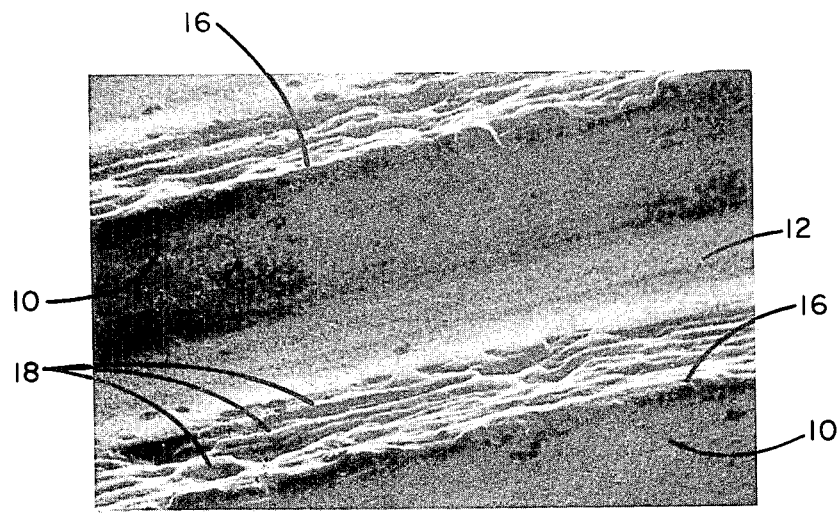
FIG. 5 is a 103X photomicrograph of a portion of a file obtained by the process of this invention.
Figure 6:
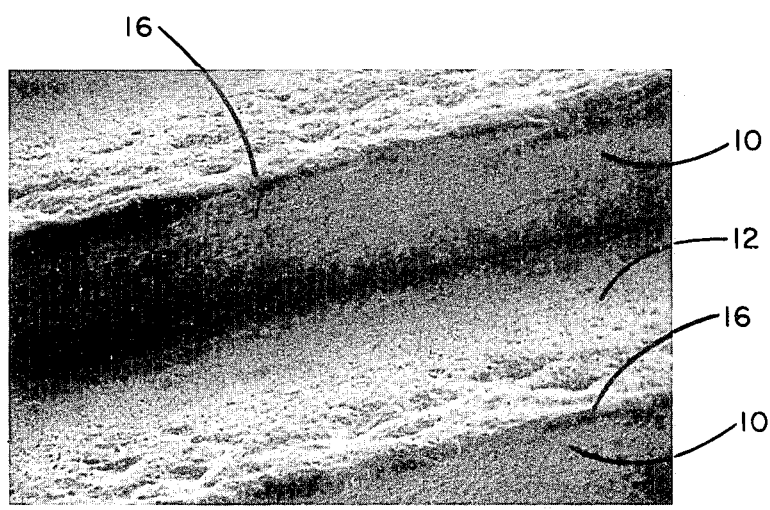
FIG. 6 is a 103X photomicrograph of a portion of a file obtained by a conventional process.

Actual photomicrographs, taken at a magnification of 103X, of a new file of this invention and of a new conventionally manufactured file are shown in FIGS. 5 and 6, respectively. In FIG. 5, illustrating the file of this invention, the serrations 18 extending longitudinally of the file tooth and generally transversely of the file itself and on the back side thereof are clearly visible. In contradistinction, the conventionally processed file of FIG. 6 clearly shows that such serrations have been eroded and substantially eliminated from the back sides of the teeth during the manufacturing process.

Apparatus for practicing the method of manufacture of this improved file is illustrated in FIGS. 7–10. Only the file cleaning station is illustrated, since the file tooth forming and file hardening procedures are considered conventional and well known in the art.

Hardened files 19 are fed into the enclosed cleaning station 20 on one or more conveyors 22. Within the cleaning station 20 the file is subjected to a substantially non-eroding pressurized stream 26 of beads of a solid material such as glass. Preferably such stream is directed from a plurality of nozzles so arranged as to direct the glass beads against all portions of the file 19 during a single pass through the cleaning station 20. Such an arrangement may suitably be as illustrated in FIGS. 8–10.

Figure 7:
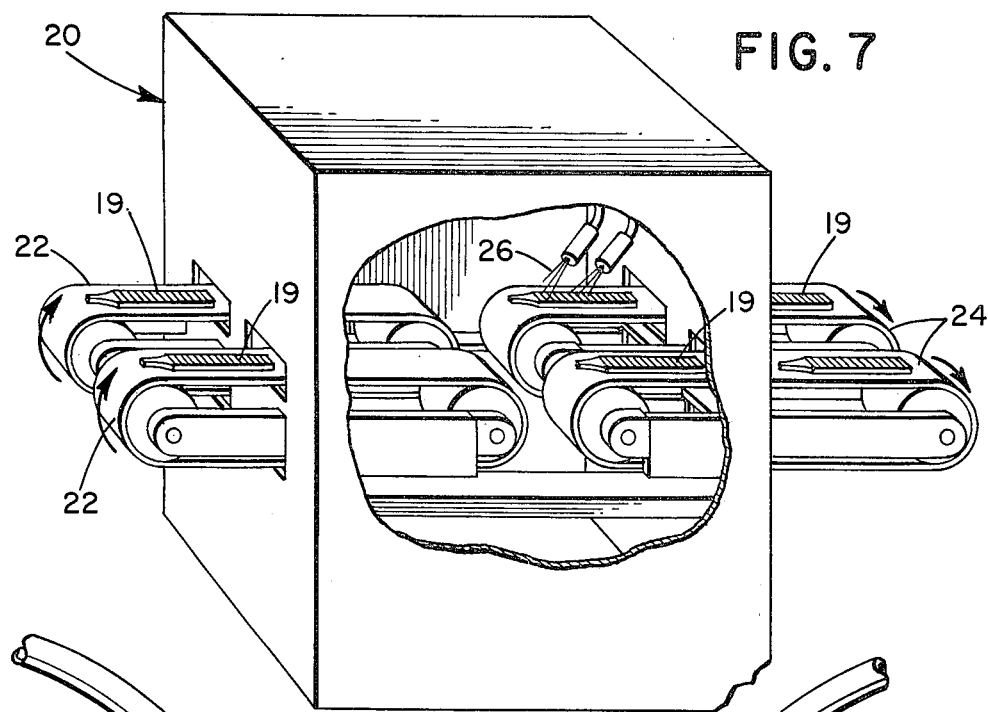
FIG. 7 is a perspective view of a file cleaning and sharpening station associated with the process of this invention.

In FIGS. 7–9, the files 19 to be processed are conveyed through the cleaning station from left to right, entering on input conveyor 22 and departing on output conveyor 24. In this embodiment, illustrating the processing of a flat, blunt-ended mill file, the blunt end is fed in first, such that the front sides 10 of the teeth face forward.

Figure 10:
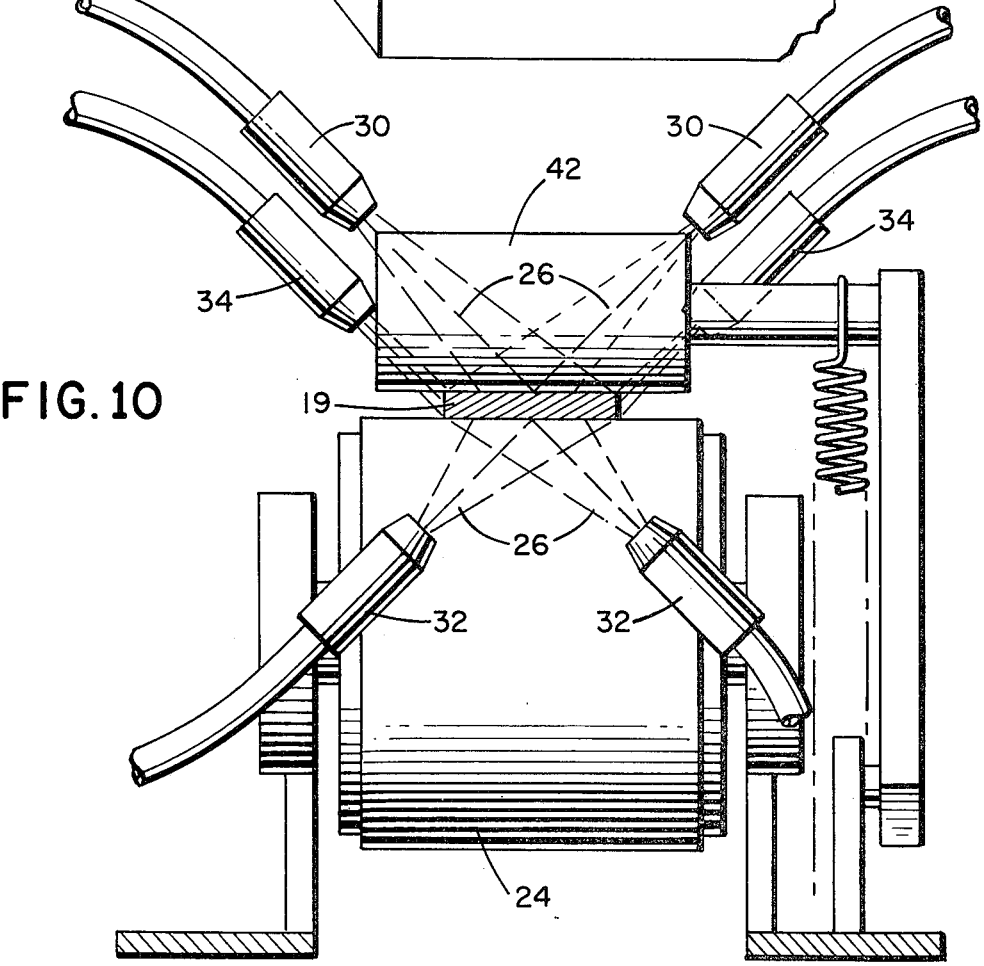
FIG. 10 is a sectional view taken along lines 10—10 of FIG. 9.

Suitably, a plurality of nozzles, such as illustrated in FIGS. 8–10, may be provided to direct the streams 26 of glass beads against the files 19. In this embodiment, nozzles 30 are positioned generally 30 to 45 degrees above the plane of the conveyors 22 and 24 and the corresponding plane of the broad faces of the files 19. Nozzles 32 are positioned generally 30 to 45 degrees below such plane; and nozzles 34, which are provided to clean the sides of the file, are positioned 45 to 60 degrees above such plane. All nozzles may desirably be angled approximately 75 degrees off the longitudinal dimension of the file, as shown in FIG. 8, thus to direct the stream 26 of glass beads across the file and against the front and back sides of the file teeth. Nozzles 32, which serve to clean the lower surface of the file, are positioned in a gap provided between input conveyor 22 and output conveyor 24. To convey a file 19 across such gap between conveyors 22 and 24, a plurality of spring biased rollers 40 and 42 are provided to cooperate with conveyors 22 and 24, respectively, in a conventional manner.

In practicing this illustrative embodiment of the invention it has been found desirable to utilize frangible glass beads of a size in the general range of 140 to 270 mesh, projected by compressed air at a pressure of 60 to 80 pounds per square inch. Of course, these parameters may be varied depending upon the size of the file teeth to be cleaned and the exposure time of the file to the pressurized stream of glass beads.

It has been determined that use of generally spherical, frangible glass beads in the blasting process provides a file having the previously described highly desirable performance characteristics, since cleaning may be performed by the shattering of substantial portions of such beads. However, the use of virgin, unshattered spherical beads alone tends to result in a file having a relatively shiny, silvery appearance, as distinguished from the matte gray finish customarily obtained by conventional file making processes. In some commercial applications it has been found desirable for aesthetic reasons to provide this new and superior file with the appearance of conventionally processed files. Accordingly, to achieve a duller matte finish, a portion of the fragments of previously shattered beads may be recirculated along with unshattered virgin beads in the blasting process. Obviously, other well-known techniques (for example, the use of an oxidizing chamber) may similarly be incorporated to provide such a matte appearance.

Since it is recognized that numerous variations of the above-described invention, such as substitution for glass beads of other materials having similar characteristics, will readily occur to one skilled in the art, the scope of this invention is to be limited not by the above-described illustrative embodiment but solely by the claims appended hereto.

I claim:

1. In a process for making a cleaned and finished file wherein crowned teeth, each having a front cutting side and a back side, are formed by chisel blows against a file blank and wherein sharp serrations extending longitudinally of each said tooth are formed on the back side of each said tooth adjacent the cutting edge thereof and then are hardened by heat treating, the improvement of preserving said serrations without substantial removal thereof during the subsequent cleaning and finishing steps of said process.

2. In a process for making a cleaned and finished file wherein crowned teeth, each having a front cutting side and a back side, are formed by chisel blows against a file blank and wherein sharp serrations extending longitudinally of each tooth are formed on the back side of each said tooth adjacent the cutting edge thereof, and then said teeth are hardened by heat treating and are cleaned and finished, the improvement which comprises contacting said file with a pressurized stream of substantially non-eroding material to effect said cleaning and finishing of said file without substantial removal of said serrations.

3. The improved file making process of claim 2 wherein said material comprises particles of solid material.

4. The improved file making process of claim 3 wherein said particles are glass beads.

5. The improved file making process of claim 4 wherein said glass beads are of a size between 140 mesh and 270 mesh.

6. In a process for making a file wherein the formation of the file teeth by striking a blank with a chisel-like bit also forms sharp serrations extending longitudinally of said teeth on the back sides of the teeth, such process including hardening the formed file by immersion of the file in a molten solution aand then cleaning said file, the improvement comprising:

said cleaning process comprising directing a pressurized stream of frangible glass beads against such file under a predetermined pressure such that undesired materials associated with the hardening process are removed from said file while retaining said sharp serrations on said teeth back sides.

7. The process of claim 6 wherein said glass beads are of generally spherical configuration.

8. The process of claim 6 wherein said pressurized stream includes both generally spherical glass beads and also fragments of previously shattered glass beads.

9. A file having teeth formed by chisel blows against a file blank, each of said teeth having a front side and a back side and each said tooth back side having a plurality of sharp serrations extending longitudinally of said tooth, generally parallel and adjacent the cutting edge thereof, said serrations formed by said chisel blows and preserved in the hardened, cleaned and finished file, whereby, in use of said file, wearing away of said cutting edge serves to expose for cutting purposes one or more of said sharp serrations.

10. A formed, hardened, cleaned and finished file with each of the teeth thereof having a front side and a back side and a cutting edge formed by the conjunction of said front side and said back side and also having cutting structure disposed on said back side adjacent and generally parallel to said cutting edge, said back side cutting structure being preserved in the finished file, whereby, in use of said file, wearing away of said cutting edge serves to expose for cutting purposes said back side cutting structure.

* * * * *